United States Patent
Ye et al.

(10) Patent No.: US 8,600,050 B1
(45) Date of Patent: Dec. 3, 2013

(54) ENCRYPTING A DATA TRANSMISSION USING MULTIPLE CHANNELS

(75) Inventors: Tao Ye, Daly City, CA (US); Darryl Veitch, Melbourne (AU); Jean C. Bolot, Mountain View, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1268 days.

(21) Appl. No.: 12/035,985

(22) Filed: Feb. 22, 2008

(51) Int. Cl.
*H04K 1/04* (2006.01)
*H04K 1/06* (2006.01)
*H04K 1/00* (2006.01)
*H04L 9/00* (2006.01)
*H04L 29/06* (2006.01)

(52) U.S. Cl.
USPC ............. 380/37; 380/28; 380/262; 380/277; 713/155; 713/160

(58) Field of Classification Search
USPC .............. 380/28–30, 255–283; 713/150–154, 713/160–167, 189–193
See application file for complete search history.

(56) References Cited

U.S. PATENT DOCUMENTS

2007/0160198 A1* 7/2007 Orsini et al. ..................... 380/28
2007/0177722 A1* 8/2007 Batcher ........................... 380/28

* cited by examiner

*Primary Examiner* — Evans Desrosiers

(57) ABSTRACT

A method, system, and media are provided for securely communicating data. One embodiment of the method includes encrypting a data stream by way of a first algorithm; creating at least two subsets of data from the data stream by extracting one or more data portions from the encrypted data stream, thereby leaving a remaining portion and an extracted portion; communicating the remaining portion to a destination by way of a first communications channel; encrypting the extracted portion utilizing a second algorithm; communicating the encrypted extracted portion to the destination by way of a second communications channel; and providing for recombining the remaining portion and the encrypted extracted portion to facilitate recovery of the encrypted data stream.

13 Claims, 5 Drawing Sheets

ENCRYPTING A DATA TRANSMISSION USING MULTIPLE CHANNELS

SUMMARY

The present invention is defined by the claims below, but summarily, embodiments of the present invention provide a system, method, and media for, among other things, securely communicating data between nodes in a networked system by utilizing multiple channels to securely transmit data based on deliberate but controlled data corruption. Embodiments of the present invention have several practical applications in the technical arts including more robustly securing data communications at relatively low additional computation cost, allowing load balancing over multiple channels, and taking advantage of increased total capacity when utilizing multiple physical interfaces.

In a first illustrative aspect, a set of computer-useable media having computer-executable instructions facilitate a method for securely communicating data. The method includes encrypting a data stream that is to be securely communicated utilizing a first algorithm. This produces an encrypted data stream that is an encrypted form of the original data stream. Thus, at least two subsets of data are created from the data stream by extracting one or more data portions from the encrypted data stream, which results in 1) a remaining portion and 2) an extracted portion. The method further includes communicating the remaining portion to a destination by way of a first communications channel, encrypting the extracted portion utilizing a second algorithm (thereby producing an encrypted extracted portion), communicating the encrypted extracted portion to the destination by way of a second communications channel, providing for the recombination of the remaining portion and the encrypted extracted portion to facilitate recovery of the encrypted data stream, and decrypting the recovered encrypted data stream to facilitate recovery of the original data stream.

In a second illustrative aspect, a set of computer-useable instructions provides a method for securely communicating data by encrypting a data stream that is to be securely communicated to a target destination. A first algorithm is applied to the data stream, thereby producing an encrypted data stream that is an encrypted form of the original data stream. The method further includes creating at least two subsets of data from the data stream by extracting one or more data portions from the encrypted data stream, which leaves a remaining portion and at least one extracted portion. The remaining portion is communicated to a destination by way of at least one communications channel. Further, the extracted portion is communicated to the destination by way of at least one other communications channel, and provision is made for recombining the remaining portion and the extracted portion to facilitate recovery of the encrypted data stream.

In a final illustrative aspect, a set of computer-useable instructions provides for securely communicating data packets by creating at least two subsets of data packets from a data packet stream that is to be securely communicated to a destination. One or more bits are removed from each packet of the data packet stream, thereby leaving a remaining portion and forming extracted portions comprising the removed bits and indicators identifying each location of the removed data bits in the data packet stream. The remaining portion is communicated to a destination by way of at least one communications channel. The extracted portion(s) are communicated to the destination by way of at least one other communications channel. The extracted portions that correspond to the remaining portions of the data packet stream are received at different times than receiving the remaining portion in this embodiment.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

CDMA Code Division Multiple Access
CD-ROM Compact Disc Read-Only Memory
DVD Digital Versatile Discs
EEPROM Electrically Erasable Programmable Read Only Memory
GSM Global System for Mobile Communications
EV-DO Evolution Data-Optimized
HSDPA High Speed Downlink Packet Access
MEO Multichannel Encryption Overlay
RAM Random Access Memory
ROM Read Only Memory
VPN Virtual Private Network
WiBro Wireless Broadband
WiFi Wireless Fidelity
WiMax Worldwide Interoperability for Microwave Access
VLAN Virtual Local Area Network As one skilled in the art will appreciate, embodiments of the present invention may take the form of, among other things: a method, system, or computer-program product. Accordingly, the embodiments may take the form of a hardware embodiment, a software embodiment, or an embodiment combining software and hardware. In one embodiment, the invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Illustrative aspects of the invention will be described in greater detail below. Listing some aspects should not be construed as an indication that other aspects do not exist.

Figure 1:
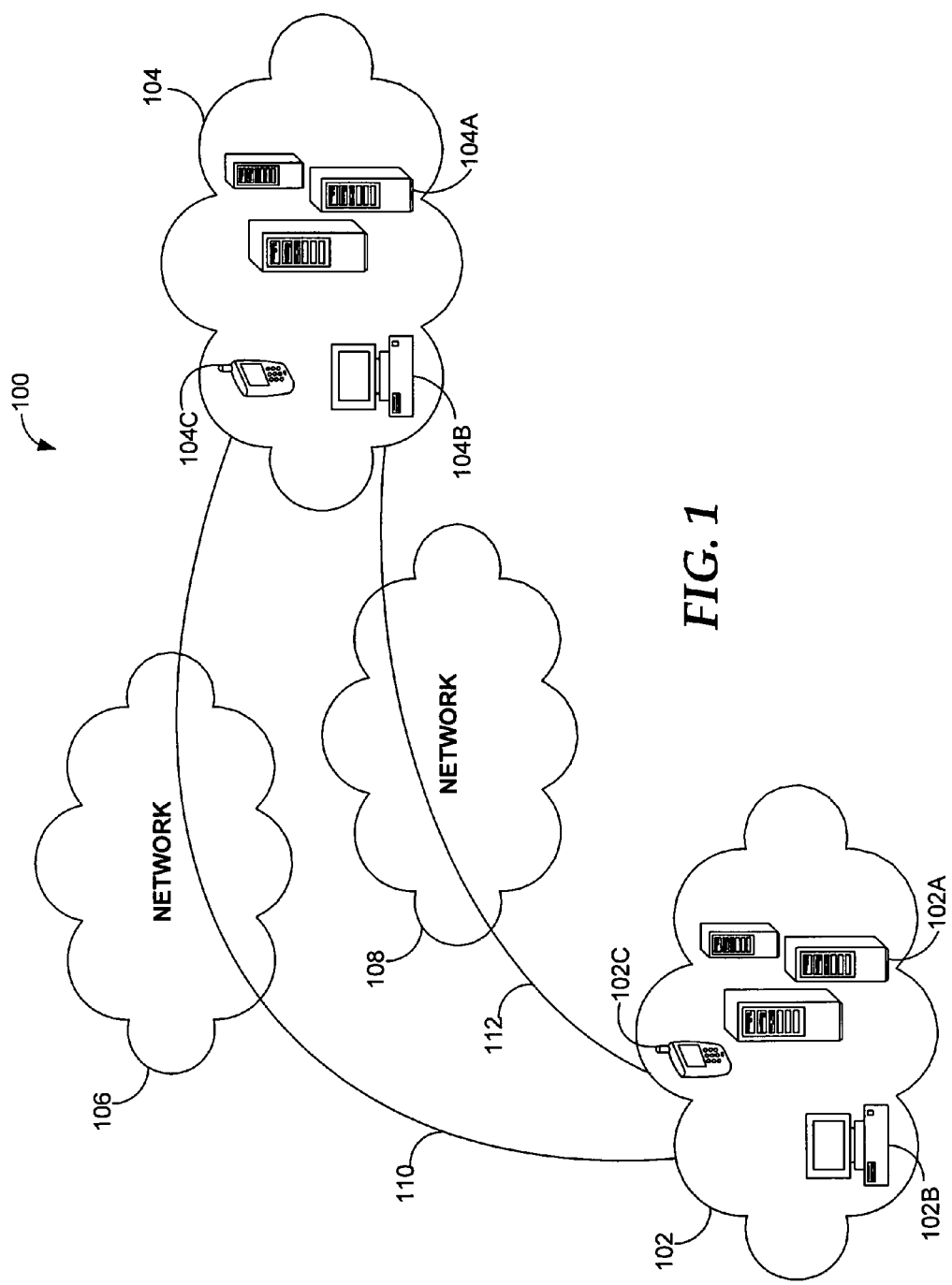
FIG. 1 depicts an illustrative operating environment suitable for practicing an embodiment of the present invention.

Turning now to FIG. 1, an illustrative operating environment suitable for practicing an embodiment of the present invention is provided and referenced generally by the numeral 100. A node 102 and 104 may be any processing location, connection point, redistribution point, source or destination point for data transmissions over communications channels 110 and 112. For example, a node may be a server 102A and 104A, a desktop computer 102B and 104B, or a mobile device 102C and 104C (such as a mobile phone, a personal data assistant, smart phone), or any other computing device that is capable of making and receiving data by way of communications networks 106 and 108. Not all connections leading to or from networks 106 and 108 are shown.

In some embodiments, communications channels 110 and 112 connect nodes utilizing a diverse and heterogeneous network of communications pathways that can be physical or logical channels that carry data between nodes. For example, mobile phones may include a cellular voice/data interface such as CDMA or GSM, Bluetooth interface, as well as a high-speed data interface such as EV-DO, HSDPA, WiFi or WiBro/WiMax. A personal computer might be connected to the Internet utilizing a fiber-optic connection, a cable or DSL line, as well as a WiFi link to a municipal mesh network or another access point, etc. Logical channels can include several kind of virtual interfaces, such as virtual private networks (VPNs), virtual LANS (VLANs), or virtualized interfaces.

Figure 2:
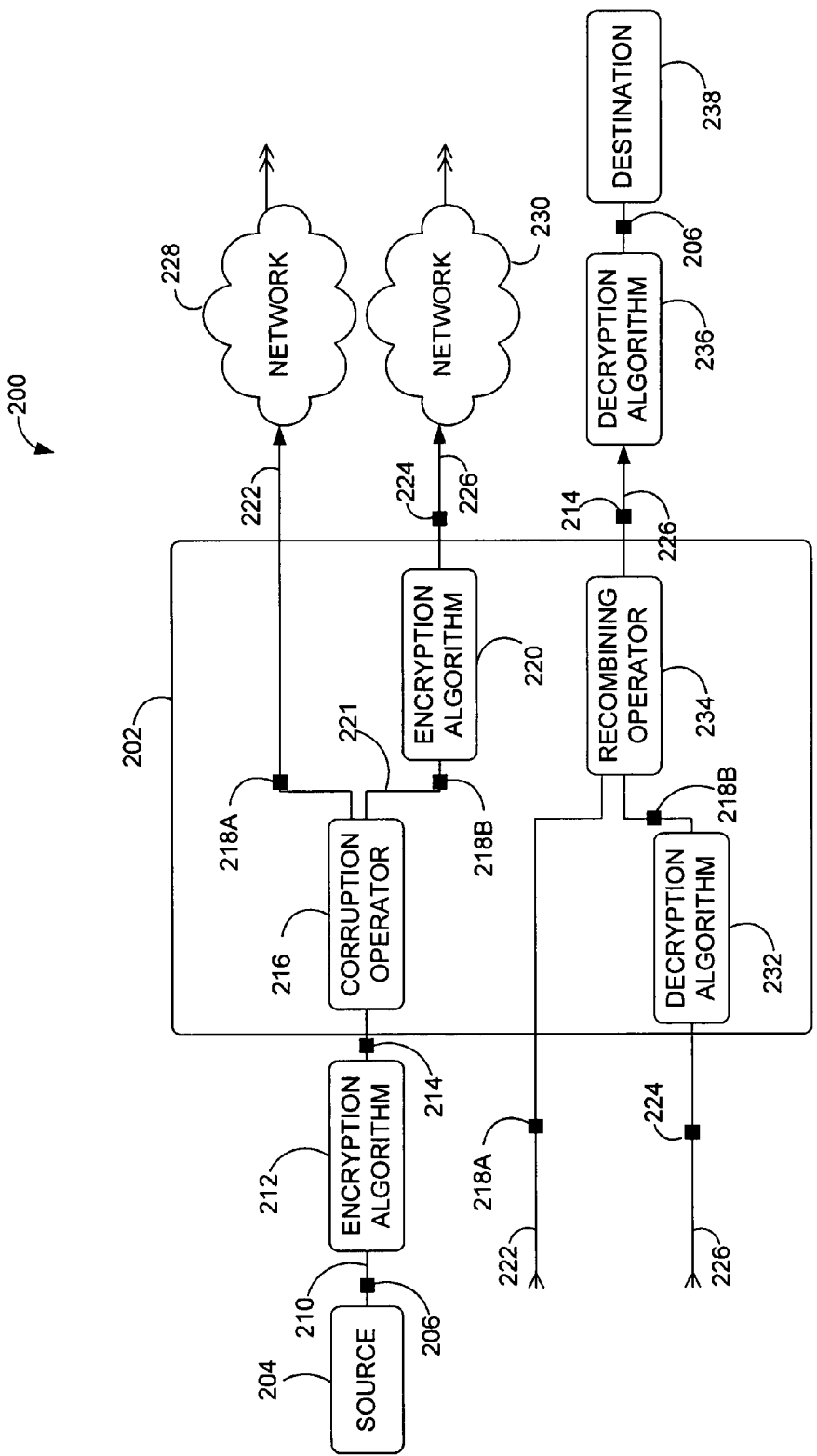
FIG. 2 depicts a block diagram of a encryption scheme suitable for practicing an embodiment of the present invention.

In FIG. 2, a block diagram of an encryption scheme suitable for practicing an embodiment of the present invention is provided and referenced generally by the numeral 200. The availability of diverse, heterogeneous communications channels 222 and 226 (physical or virtual) between a source 204 and a destination 238 through networks 228 and 230, respectively, can be used to increase the security of the data transmitted between them in addition to utilizing underlying encryption techniques.

More specifically, process 202 is layered on top of an existing communications channel to increase security by splitting data so that it is transferred over multiple channels 222 and 226 through networks 228 and 230 (which may be the same network) in a way that significantly increases security. Process 206 corrupts 214, by forming two streams 218A and 218B, each of which is communicated by way of separate channels 222 and 226, respectively. That is, first portion 218A, sometimes referred to herein for ease of reference as "the remaining portion," is communicated by way of channel 222, and second portion 218B, sometimes referred to herein for ease of reference as "the extracted portion" is communicated by way of channel 226.

Figure 3:
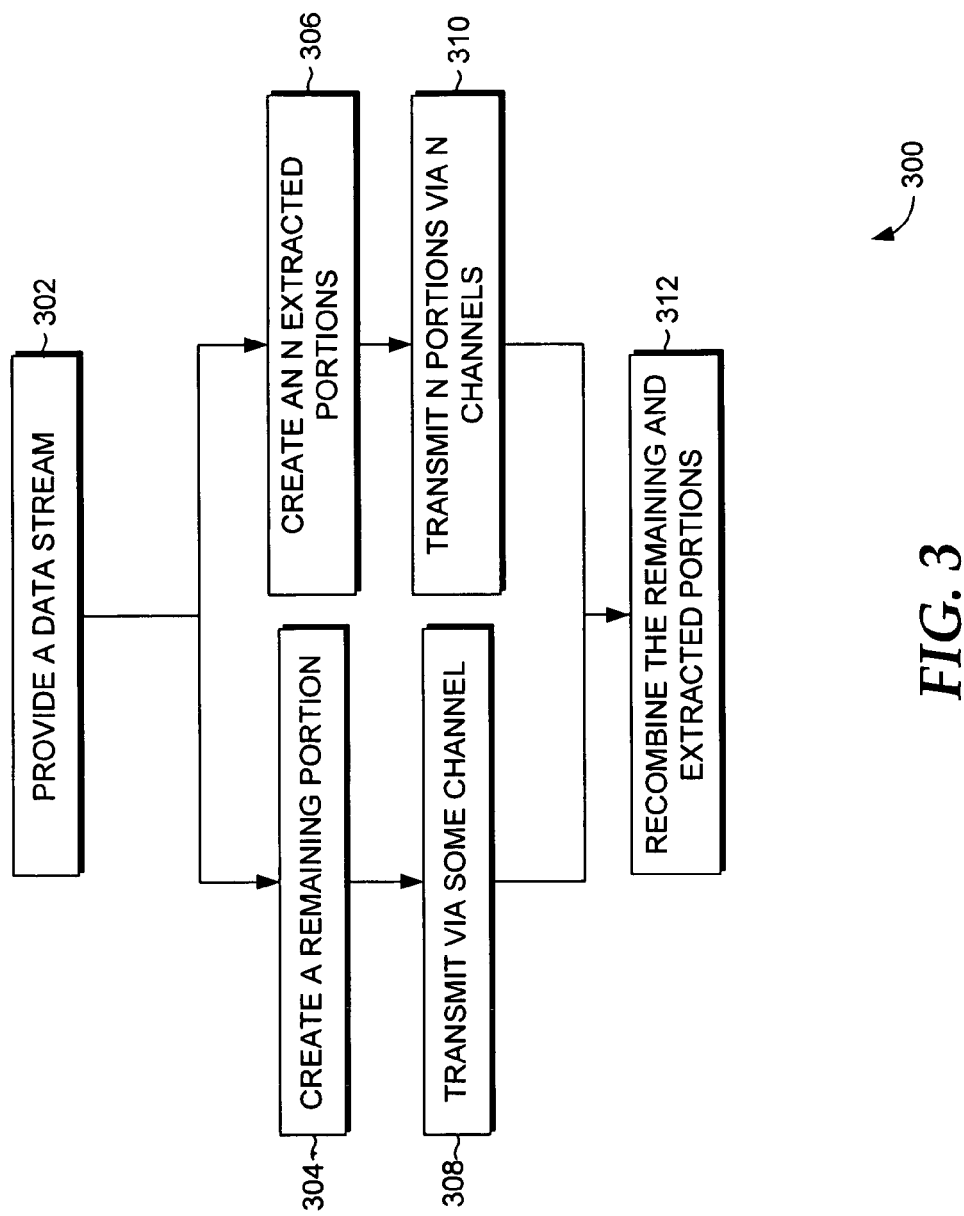
FIG. 3 depicts a process flow that illustrates securing a data stream according to one embodiment of the present invention.

This process can be abstracted to more channels, as is depicted in FIG. 3, which illustrates a process flow for securing a data stream according to one embodiment of the present invention and referenced generally by the numeral 300. In FIG. 3, a provided data stream 302 is split to create a remaining portion 304 and possibly multiple N extracted portions at a step 306. The remaining portion 304 is then transmitted 308 by of a first channel and the extracted portions 306 are transmitted 310 across multiple, and as many as N channels 310, one per extracted portion. The remaining portion and extracted portion are then recombined at a step 312 to facilitate the recovery of the data stream.

Returning to FIG. 2, an initial (albeit already encrypted in some embodiments) data transmission is referred to herein by the numeral 214. In some embodiments, the data stream 206 transmission is a stream of packets from a source node 204. The source data stream 206 can be viewed as a stationary packet process appearing over an initial channel 210. Packets can be the same or different sizes, even varying sizes in some embodiments. Any encrypting algorithm 212 generates a stream of encrypted bits 214 assembled into packets from source 204.

For each encrypted data stream 214, a bit-level corruption operator 216 alters any number or sequence of encrypted bits in data stream 214 by, for example, removing bits, to produce a remaining portion 218A and an extracted portion 218B. In other embodiments, the bit-level corruption operator 216 may alter the data stream by toggling, adding, shifting, or rearranging bits. The extracted portion 218B, which may include bit positions, or any combination thereof may form any number of data streams of specified or varying sizes. There exist ways in which the bit positions can be changed for each packet and yet be effectively hidden from the attacker. For example a pseudo-random sequence of high period could be used, the initializing seed and/or parameters of which could be communicated to the recombining operator 234 utilizing a separate secure key exchange (for example RSA) prior to the data transfer.

We will restate an illustrative process with reference to FIG. 2. Some stream of packets 206 (variously referred to as a data stream) is provided by some source 204. The source and type of packets does not matter. Source 204 may be any source that provides streams of packets. Illustrative sources include digital television providers, network routers, computers, mobile devices, etc.

Although we indicate by reference numeral 212 that the initial data stream 210 is subjected to a first encryption algorithm, it does not have to be. In one embodiment, it is, but in other embodiments, the stream 210 may be directly received by corruption operator 216. Corruption operator performs a process of intentionally corrupting data stream 214, which may be identical to data stream 206, but providing a separate reference numeral helps make explaining the drawing easier. The process that corruption operator 216 performs may be one or more of a myriad of options. The various possibilities abound. As long as what is done is tracked, the specific type of corruption is not as relevant.

For example, perhaps corruption operator 216 toggles every Nth bit of data stream 214. Maybe it toggles the first five bits, then the next three, then back to five, etc. In other embodiments, the bits that get toggled is determined by a random process. Data indicating the corruption process can be communicated as all or part of data 218B. In still other embodiments, data can be removed from stream 214. For example, maybe every $30^{th}$ bit is removed from stream 214. This would leave a remaining portion 218A and a removed portion 218B. Maybe every $5^{th}$ bit is removed. Or maybe even just one single bit of stream 214 is removed. If it is desirable to maintain the same packet size, padding can supplement a remaining portion. Padding can be ones or zeroes, or even a combination. Padding can be added to the beginning of data packets or to the end.

In one embodiment, padding information is tracked, and communicated to recombining operator 234 to help facilitate recombining data portions 218A and 218B in embodiments where data is segregated and decoding is not known. In other embodiments, a random-number generator works in synchronization at the corruption operator 216 and the recombining operator 234 to provide for recombining the corrupted data without sending such information. Bit-position information does not need to be sent to the recombining operator 234 for it to know how to recombine the data portions 218A and 218B.

In some embodiments, decoding data is not known. Information on how to decode a stream is not necessary if an implementer opts to hard code such information. For example, corruption operator may toggle every 5th bit. In such as case, recombining operator 234 may toggle back every fifth bit of the data stream packets that it receives. Perhaps corruption operator applies a first corruption scheme during certain hours of the day and other schemes during other times. The recombining operator could be programmed in the same way.

But as mentioned, in some embodiments, data 218B is communicated to recombining operator 234 because it 234 relies on the data 218B to know how to recombine that data 218A and 218B that it receives.

Returning to the corruption operator 216, data 218A and 218B is communicated way of two separate channels 222 and 221. Though shown as separate lines, channels 222 and 221 may be virtual or physical. That is, they may flow across the same physical channel, and thus defined by two virtual channels. This would allow existing data channels to be used. For example, channel 222 may already exist, but there is not physical channel 221. In this case, channel 221 becomes a virtual channel, and sent along the same medium as that which allows 222. This is why networks 228 and 230 may actually be the same networks in some embodiments. But if added security is desired, then the channels can be physically separate, an the networks 228 and 230 can be separate, and even different types (e.g., one a wireless communications network, and another a cable network for example).

In one embodiment extracted/informative portion 218B is encrypted again by encryption algorithm 220. This is not a technical requirement of all embodiments of the invention (though certain claims below might require it), but does increase the security beyond what it would be if it 218B was not encrypted again. When it is encrypted, the extraction portion 218B is encrypted, thereby making deciphering the original stream 206 that much harder to do.

The packets are ultimately received by recombining operator 234. If the extracted portion 224 needs to be decrypted, it is by way of decryption algorithm 232, which undoes any encryption performed by encryption algorithm 220. After the packets are recombined to form stream 214, that recombined stream can be decrypted by algorithm 236, which undoes what encryption algorithm 212 did.

Figure 4:
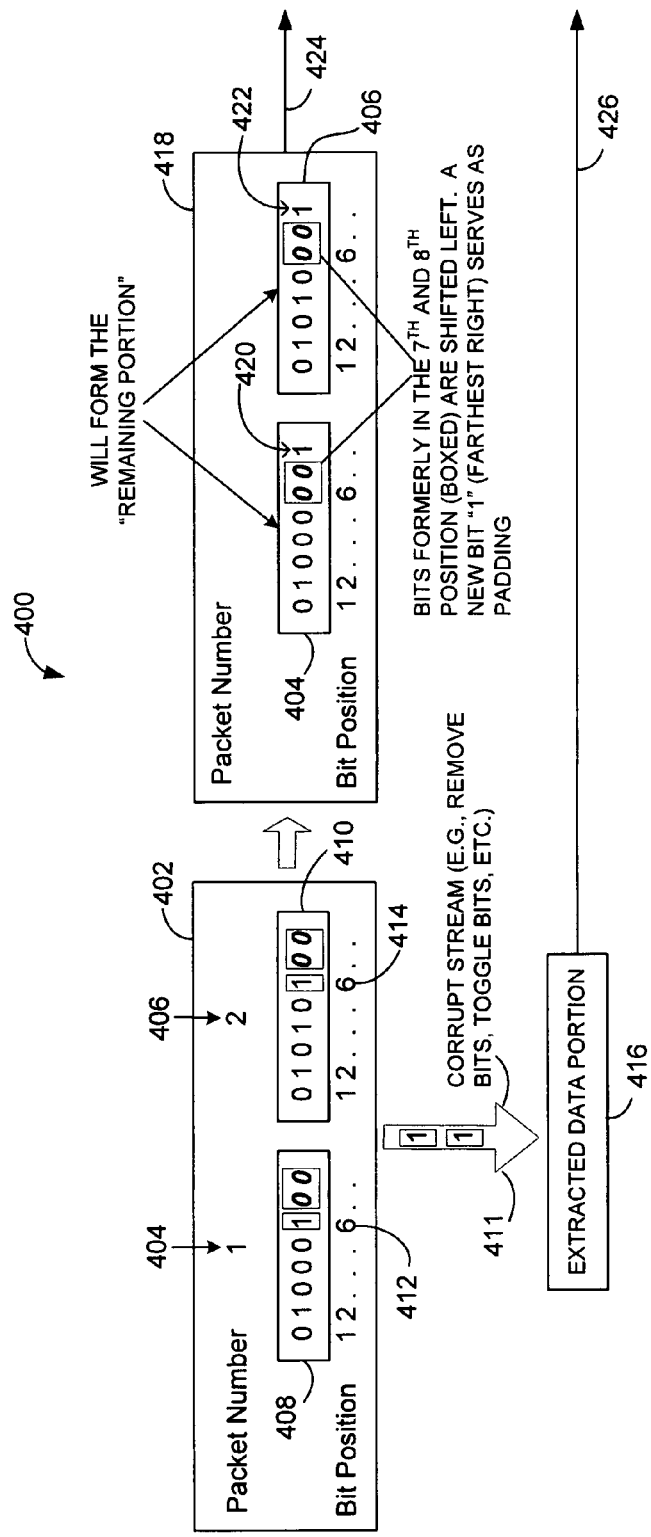
FIG. 4 depicts a bit-level corruption process for extracting bits from a data stream to form separate portions according to an embodiment of the present invention.

Turning now to FIG. 4, an illustrative diagram depicts a bit-level corruption process for extracting bits from a data stream to form separate portions according to an embodiment of the present invention and referenced generally by the numeral 400. A bit-level corruption process of a data stream 402 begins by identifying bits from each packet 408 and 410 that are to be removed, and removing 411 them to form an extracted data portion 416. In other embodiments, step 411 could include toggling random bits or any other aforementioned processes. The extracted data portion may include bits 408 and 410, their respective bit positions 412 and 414, and their corresponding packet numbers. The remaining data portion 418 includes the data packets 404 and 406 with bits 408 and 410 removed. The data packets 408 and 410 are then shifted to the left (or the right) and padded with data 420 and 422 (shown as "1"s, but could be zeroes) on the right. The remaining data portion 418 is sent out along channel 424, and the extracted data portion 416 is sent out along a different channel 426.

Turning back to FIG. 2, the remaining portion 218A forms a stream which is sent out along a channel 222 with a higher bandwidth. To hide the extracted portion, that forms another data stream 218B, that data stream is encrypted utilizing a second encryption algorithm 220, which may be different or the same as the first encryption algorithm 212, and the resulting stream 224 is sent out along a separate channel 226 with a lower bandwidth. It may take several packets from the source data node 204 to assemble a packet of the extracted portion 218B. When bits are removed, the resulting remaining portion 218A may be smaller or the remaining portion may be shifted and padded with data points to maintain a size equal to that prior to extracting data portions. In some embodiments, the overlay essentially builds on any encryption algorithm in a modular way by removing data portions from a data stream and reducing the amount of information transmitted over a channel to increase the effort required to decipher the data, based on intercepting (sniffing) encrypted data, via the notion of the number of packets needed to recover a message.

To recover the original data stream 206, a receiver must collect the packets from the channels 222 and 226 that have been communicated through networks 228 and 230 and invert the above steps. That is, the extracted portion 224 is decrypted utilizing a decryption algorithm 232 and recombined utilizing a recombining operator 234 with the remaining portion 218A to produce the encrypted signal 214, which is then decrypted by decryption algorithm 236 to recover the original data stream 206. Additionally, recombining at 234 is dependent on any time lag between the arrival of the remaining portion 218A and the extracted portion 218B. Thus conceptually the overlay sits between the underlying encryption algorithm 212 and decryption algorithm 236. In terms of implementation, the encryption algorithm 212 and the process 202 may be closely linked, for example in a driver which communicates with multiple physical interfaces but is not so limited.

Figure 5:
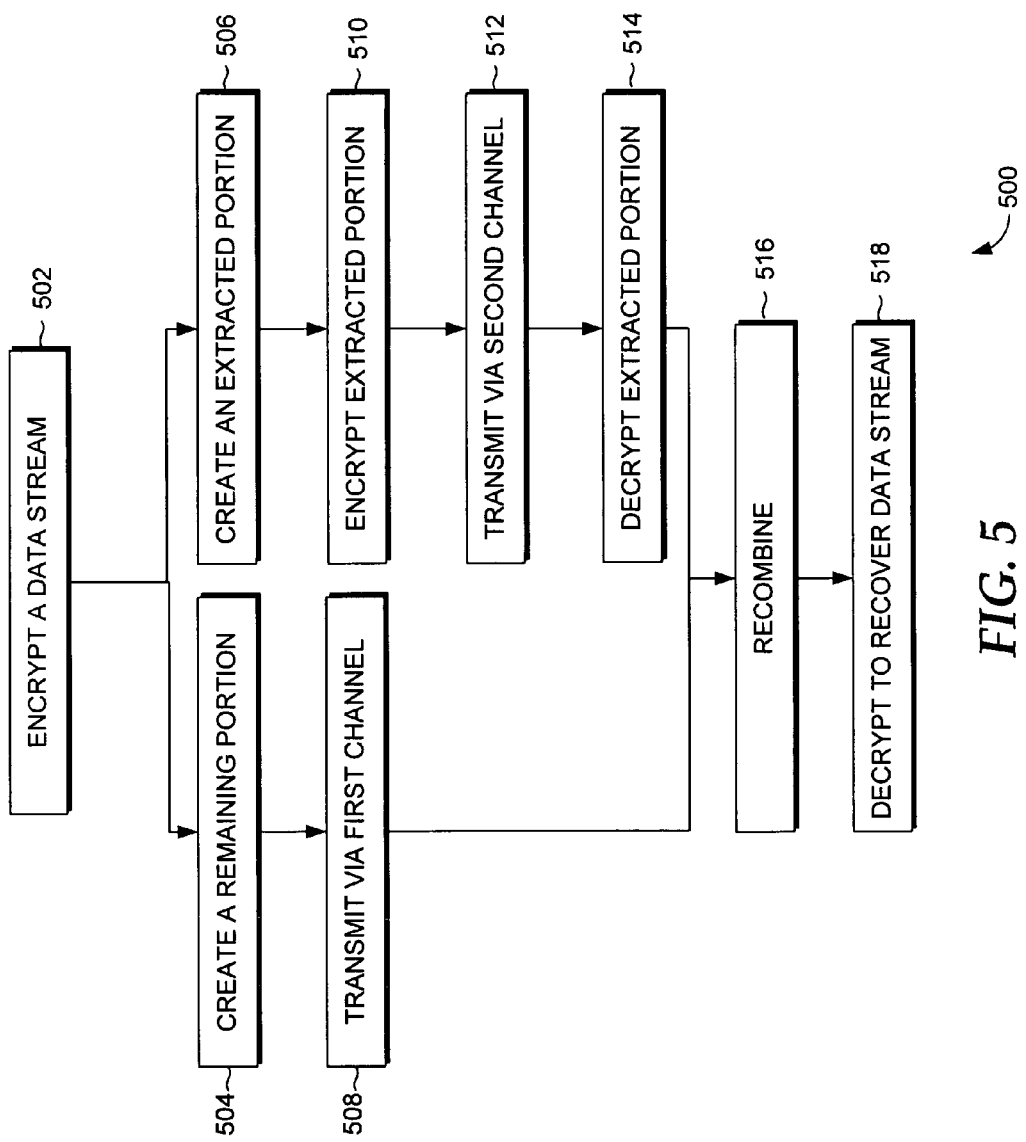
FIG. 5 depicts a process flow that illustrates securing a data stream according to another embodiment of the present invention.

FIG. 5 depicts a process flow that illustrates securing a data stream according to an embodiment of the present invention and referenced generally by the numeral 500. At a step 502, an encrypted data stream is split to create a remaining portion 504 and an extracted portion 506. The remaining portion is then transmitted via a first channel at a step 508. The extracted portion is encrypted 510 to produce an encrypted extracted portion that is then transmitted 512 via a second channel. The two portions are sent along different channels, significantly increasing security by inherently producing a delay in receiving the two portions at a destination node. Prior to recombining the two data portions, the encrypted extracted portion is decrypted 514 by a decryption algorithm to facilitate the recovery of the created extracted portion that was sent along the second channel. The two portions are then recombined 516 and the recombined data stream is then decrypted 518 to facilitate the recovery of the data stream.

Several overlay parameters can be utilized and offer a tunable functionality to optimize and balance security, delay, bandwidth, and other requirements (battery, nature of communication, etc). These parameters include the number of bits extracted and the extracted packet size. For example, bandwidth sharing across channels can be controlled by the number of bits extracted, whereas the total offered load is invariant. Furthermore, a packet rate is controlled by both the number of bits extracted and the extracted packet size. The degree of security enhancement can be traded off against bandwidth load balancing.

Embodiments of the invention are not limited to the class of encryption algorithms that are vulnerable to attack based on intercepting (sniffing) cipher-text. Even for ciphers outside this class (for example RSA where key factorization is the accepted mode of attack, a process which does not even look at encryption-algorithm text), corrupting the encryption-algorithm text may still render it difficult to recover the plain-text message, even with the key known.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory media having computer-executable instructions embodied thereon for performing a method of securely communicating data, the method comprising:
    encrypting a data stream that is to be securely communicated utilizing a first algorithm, thereby producing an encrypted data stream that is an encrypted form of the data stream;
    splitting the encrypted data stream in to at least two encrypted data portions, wherein the extracted portion comprises data portions removed from the encrypted data stream and data-position indicators identifying each location of the removed data portions in the encrypted data stream;
    creating at least two subsets of data from the encrypted data stream by extracting one or more encrypted data portions from the encrypted data stream, thereby leaving a remaining portion and at least one extracted portion;
    communicating the remaining portion to a destination by way of at least one communications channel;
    communicating the extracted portion to the destination by way of at least one other communications channel; and
    providing for recombining the remaining portion and the extracted portion to facilitate recovery of the encrypted data stream, wherein the recombining comprises temporally matching and reassembling data by reinserting the removed data portions from the extracted portion from the other communications channel into correct positions of the remaining portion from the communications channel as indicated by the position indicators from the extracted portion from the other communications channel.

2. The media of claim 1, wherein the extracted portion comprises indicators of data portions having bits that were toggled in the encrypted data stream.

3. The media of claim 2, wherein the recombining comprises temporally matching and reassembling data by retoggling the toggled data portions as indicated by the indicators from the extracted portion from the other communications channel in the remaining portion from the communications channel.

4. The media of claim 1, wherein the remaining portion includes supplementary data that serves as padding to maintain a size equal to that prior to extracting the one or more data portions.

5. The media of claim 1, wherein the destination receives the encrypted extracted portion after receiving the remaining portion.

6. One or more non-transitory media having computer-executable instructions embodied thereon for performing a method of securely communicating data packets, the method comprising:
    creating at least two subsets of data packets from a data packet stream that is to be securely communicated, wherein one or more bits are removed from each packet of the data packet stream, thereby leaving a remaining portion and forming extracted portions comprising the removed bits and position indicators identifying each location of the removed data bits in the data packet stream;
    communicating the remaining portion to a destination by way of at least one communications channel;
    communicating the extracted portions to the destination by way of at least one other communications channel; and
    receiving the extracted portions that correspond to the remaining portions of the data packet stream at different times than receiving the remaining portion, wherein the received extracted portions are recombined by temporally matching and reassembling data packets by reinserting the removed data bits from the extracted portions from the other communications channel into correct positions of the remaining portion from the communications channel as indicated by the position indicators from the extracted portion from the other communications channel.

7. The media of claim 6, wherein the remaining portion includes supplementary data that serves as padding to maintain a packet size equal to that prior to extracting the one or more bits.

8. The media of claim 6, wherein the removed bits are selected from each of the data packets in the data packet stream by utilizing a random or pseudo-random selection sequence.

9. A computer-implemented method of securely communicating data, the method comprising:
    encrypting a data stream that is to be securely communicated by utilizing a first algorithm, thereby producing an encrypted data stream that is an encrypted form of the data stream;
    splitting the encrypted data stream to at least two encrypted data portions, wherein the extracted portion comprises data portions removed from the encrypted data stream and data-position indicators identifying each location of the removed data portions in the encrypted data stream;
    creating at least two subsets of data from the encrypted data stream by extracting one or more encrypted data portions from the encrypted data stream, thereby leaving a remaining portion and at least one extracted portion;
    communicating the remaining portion to a destination by way of at least one communications channel;
    communicating the extracted portion to the destination by way of at least one other communications channel; and
    providing for recombining the remaining portion and the extracted portion to facilitate recovery of the encrypted data stream, wherein the recombining comprises temporally matching and reassembling data by reinserting the removed data portions from the extracted portion from the other communications channel into correct positions of the remaining portion of the communications channel as indicated by the position indicators of the extracted portion from the other communications channel.

10. The method of claim 9, wherein the extracted portion comprises indicators of data portions having bits that were toggled in the encrypted data stream.

11. The method of claim 10, wherein the recombining comprises temporally matching and reassembling data by retoggling the toggled data portions as indicated by the indicators of the extracted portion from the other communications channel in the remaining portion of the communications channel.

12. The method of claim 9, wherein the remaining portion includes supplementary data that serves as padding to maintain a size equal to that prior to extracting the one or more data portions.

13. The method of claim 9, wherein the destination receives the encrypted extracted portion after receiving the remaining portion.

* * * * *